US009204622B2

(12) United States Patent  (10) Patent No.: US 9,204,622 B2
Wong et al.  (45) Date of Patent: Dec. 8, 2015

(54) ANIMAL DETERRENT DEVICE

(71) Applicant: SUNBEAM PRODUCTS, INC., Boca Raton, FL (US)

(72) Inventors: Anson Wong, Boca Raton, FL (US); Kim Wah Chung, Shatin (HK)

(73) Assignee: Sunbeam Products, Inc., Boca Raton, FL (US)

( * ) Notice: Subject to any disclaimer, the term of this patent is extended or adjusted under 35 U.S.C. 154(b) by 36 days.

(21) Appl. No.: 14/227,001

(22) Filed: Mar. 27, 2014

(65) Prior Publication Data

US 2014/0299071 A1  Oct. 9, 2014

Related U.S. Application Data

(60) Provisional application No. 61/806,443, filed on Mar. 29, 2013.

(51) Int. Cl.
*A01M 29/00* (2011.01)
*A01K 15/02* (2006.01)
*A01M 29/12* (2011.01)
*A01M 31/00* (2006.01)
*A01M 1/20* (2006.01)

(52) U.S. Cl.
CPC ............ *A01K 15/023* (2013.01); *A01M 1/2038* (2013.01); *A01M 29/12* (2013.01); *A01M 31/002* (2013.01)

(58) Field of Classification Search
CPC ... A01M 29/10; A01M 31/002; A01M 29/30; A01M 29/16; A01M 29/12; A01M 29/06; A01M 29/08; A01M 29/18; A01K 15/023; A01K 15/02; A01K 15/021; A01K 15/022; B05B 12/122; B05B 12/12; Y10S 119/905; Y10S 119/908
USPC ................. 119/720, 712, 719, 721, 908, 905; 340/573.2, 573.3, 689; 40/412
See application file for complete search history.

(56) References Cited

U.S. PATENT DOCUMENTS

| 3,970,939 | A | * | 7/1976 | Willis | 340/307 |
| 4,185,581 | A | * | 1/1980 | Tilton | 116/22 A |
| 5,009,192 | A | * | 4/1991 | Burman | 119/720 |
| 5,458,093 | A | * | 10/1995 | MacMillan | 119/720 |
| 5,603,287 | A | * | 2/1997 | Houck | 119/719 |
| 5,606,305 | A | | 2/1997 | Jan | |
| 5,656,804 | A | * | 8/1997 | Barkan et al. | 235/472.01 |
| 5,845,984 | A | * | 12/1998 | Bonilla | 362/101 |
| 5,878,956 | A | * | 3/1999 | Djukastein et al. | 239/69 |
| 6,016,100 | A | | 1/2000 | Boyd et al. | |
| D424,560 | S | | 5/2000 | Heath | |
| 6,166,996 | A | | 12/2000 | Grissom et al. | |
| 6,191,693 | B1 | * | 2/2001 | Sangsingkeow | 340/573.3 |
| 6,615,770 | B2 | | 9/2003 | Patterson et al. | |
| 6,637,376 | B2 | | 10/2003 | Lee | |
| 6,700,486 | B1 | * | 3/2004 | Banki | 340/541 |
| 6,987,460 | B2 | * | 1/2006 | Tews et al. | 340/689 |

(Continued)

*Primary Examiner* — Yvonne Abbott-Lewis
(74) *Attorney, Agent, or Firm* — Seth M. Blum (57) ABSTRACT

The animal deterrent device of the present disclosure utilizes and automatic system to detect the presence of an animal in a designated area. Upon detection, the animal deterrent device releases a deterring stimulus. The deterring stimulus is intended to remove the animal from the designated area, and through continuous use, eventually training the animal from entering the designate area. The designation area can include: furniture, such as a couch, chair, table, etc; a room or portions thereof; plants, indoor or outdoor gardens; and the like.

14 Claims, 9 Drawing Sheets

(56) References Cited

U.S. PATENT DOCUMENTS

| | | |
|---|---|---|
| 6,989,745 B1 * | 1/2006 | Milinusic et al. ............ 340/541 |
| 7,278,375 B2 * | 10/2007 | Ross et al. .................... 119/719 |
| 7,337,750 B2 * | 3/2008 | Drake .......................... 119/712 |
| 7,345,588 B2 | 3/2008 | Gerig |
| 7,394,390 B2 | 7/2008 | Gerig |
| D574,282 S | 8/2008 | Hill |
| 7,462,364 B2 * | 12/2008 | Bell .............................. 424/405 |
| 7,658,166 B1 * | 2/2010 | Rheinschmidt et al. ...... 119/718 |
| 7,690,146 B2 * | 4/2010 | Jong et al. .......................... 43/1 |
| D630,388 S | 1/2011 | Lai |
| D630,389 S | 1/2011 | Lai |
| 7,913,653 B2 * | 3/2011 | Jordan ......................... 119/859 |
| 7,948,381 B2 * | 5/2011 | Lindsay et al. ............ 340/572.3 |
| 8,683,956 B2 * | 4/2014 | Rafailovich .................. 119/264 |
| 8,904,968 B1 * | 12/2014 | Nelson .......................... 119/712 |
| 8,963,446 B2 * | 2/2015 | Hellkamp ..................... 315/297 |
| 9,044,770 B1 * | 6/2015 | Eyring et al. |
| 2007/0095303 A1 | 5/2007 | Lee, IV et al. |
| 2009/0034369 A1 | 2/2009 | Hill |
| 2009/0120373 A1 | 5/2009 | Wetzel et al. |
| 2010/0110838 A1 | 5/2010 | Gotz et al. |
| 2010/0156643 A1 | 6/2010 | Gillis et al. |

* cited by examiner

ANIMAL DETERRENT DEVICE

CROSS-REFERENCE TO RELATED APPLICATION

The present application claims priority to U.S. Provisional Application No. 61/806,443, entitled Animal Deterrent, filed on filed on Mar. 29, 2013, the contents of which are herein incorporated by reference in its entirety.

FIELD OF THE INVENTION

The invention relates to a device and a method for deterring animals from performing and unwanted behavior such as entering or approaching a designated area, climbing on indoor or outdoor furniture or the like. More specifically, the subject deterrent device utilizes a sudden jet spray of a compressed gas to startle the animal, deterring it from performing the unwanted behavior.

BACKGROUND OF THE INVENTION

Pet, such as dogs and cats, etc. have been known to cause harm to indoor furnishings, plants and the like by scratching, lying upon and in general having access to such objects. Similarly, pets and wild animals have been known cause harm to out furnishing, plants, and garden areas. To combat such unwanted behavior, devices are know to deter the animal by producing a deterring stimulus which startles or scares the animal. These deterring stimulus can include the spraying the animal with water, emitting a loud sound, or flashing lights, or combinations thereof.

SUMMARY OF THE INVENTION

The animal deterrent device of the present disclosure utilizes and automatic system to detect the presence of an animal in a designated area. Upon detection, the animal deterrent device releases a deterring stimulus. The deterring stimulus is intended to remove the animal from the designated area, and through continuous use, eventually training the animal from entering the designate area. The designation area can include: furniture, such as a couch, chair, table, etc; a room or portions thereof; plants, indoor or outdoor gardens; and the like.

The animal deterrent device includes a housing having a canister containing a compressed gas connected to a valve system. The valve system can include a solenoid valve. The valve system includes an output nozzle, such that when the valve is open compressed gas exits the nozzle to create a deterring sound.

A motion sensor is provided on the housing to actuate the valve. In this manner, when an animal passes with range of the motion sensor, the motion sensor actives (opens) the valve to create the deterring sound. The nozzle can be movable with respect to the housing, such that the output direction of the nozzle can be adjusted.

Additionally, an orientation (tilt) sensor can be provided to verify that the animal deterrent device is in the proper (vertical) orientation for operation. If the animal deterrent device is tilted at a specified angle from vertical, the tilt sensor will prevent operation of the valve system.

To operate the animal deterrent device the following step are performed:

1. Turn on the unit by pressing the control button in the front. The Green LED will light up. The Green LED flashes every 5 seconds once it has been turned on.

2. If the battery level is low, the LED will be flashing in RED. The system will not work until the user has replaced the batteries.

3. There is an orientation switch inside the PC board. Shall the device be tilted for a certain angle (varies by components), the device will stop working even though the ON/OFF switch is at ON position. This will avoid spraying liquid if the canister is inverted.

4. Once the unit has been turned on around 10 seconds by pressing the ON/OFF button, the passive infrared sensor will start detecting motion if the unit is at the upright position. If a motion was detected, the solenoid valve will be energized and push the valve open for 0.6 second. The sound level can be around 90 to 95 dBA measured at 12 inches. The device will be suppressed for 4 seconds which means the unit will spray again after 4 seconds if motions are detected.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
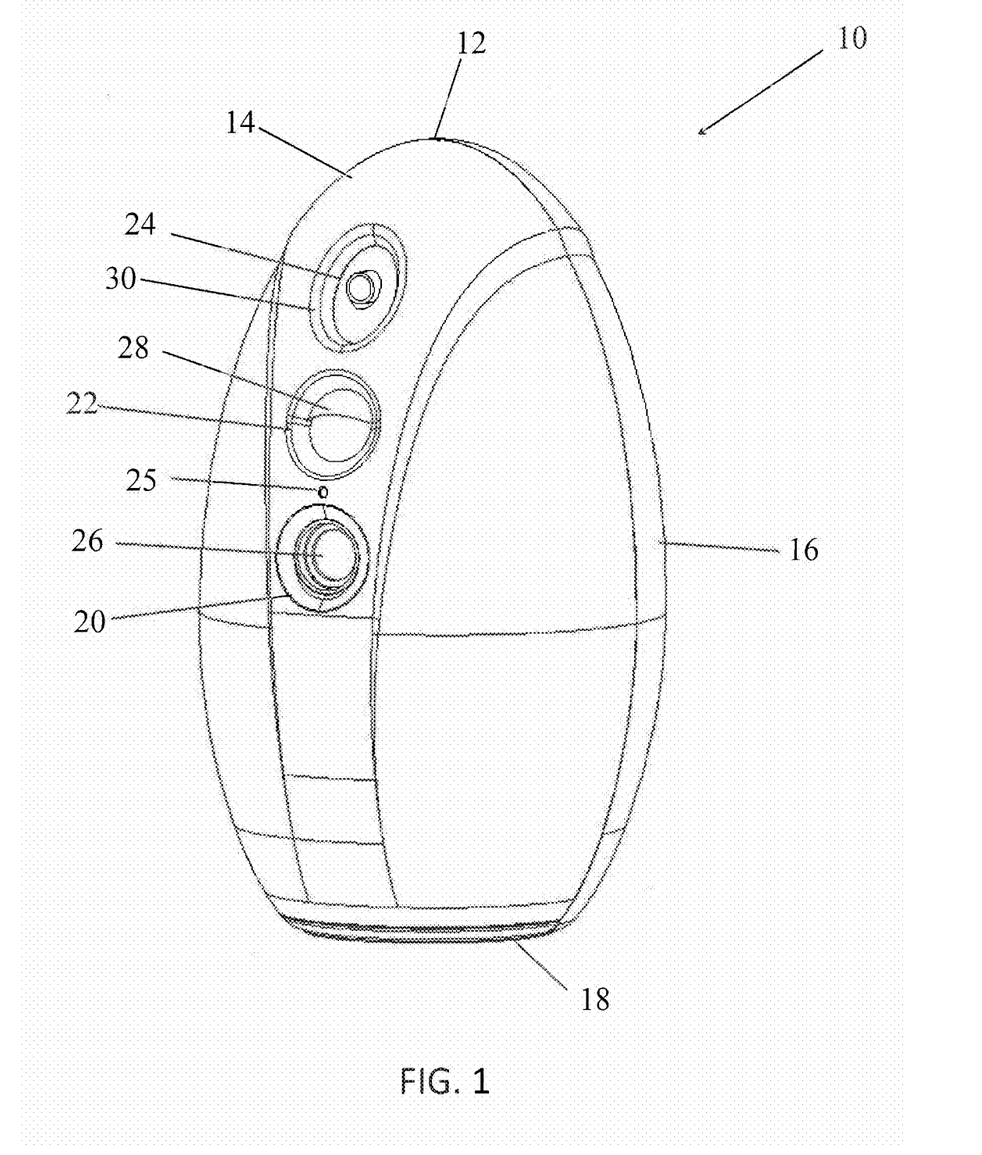
FIG. 1 depicts a front isometric view of an animal deterrent device of the present disclosure.
Figure 2:
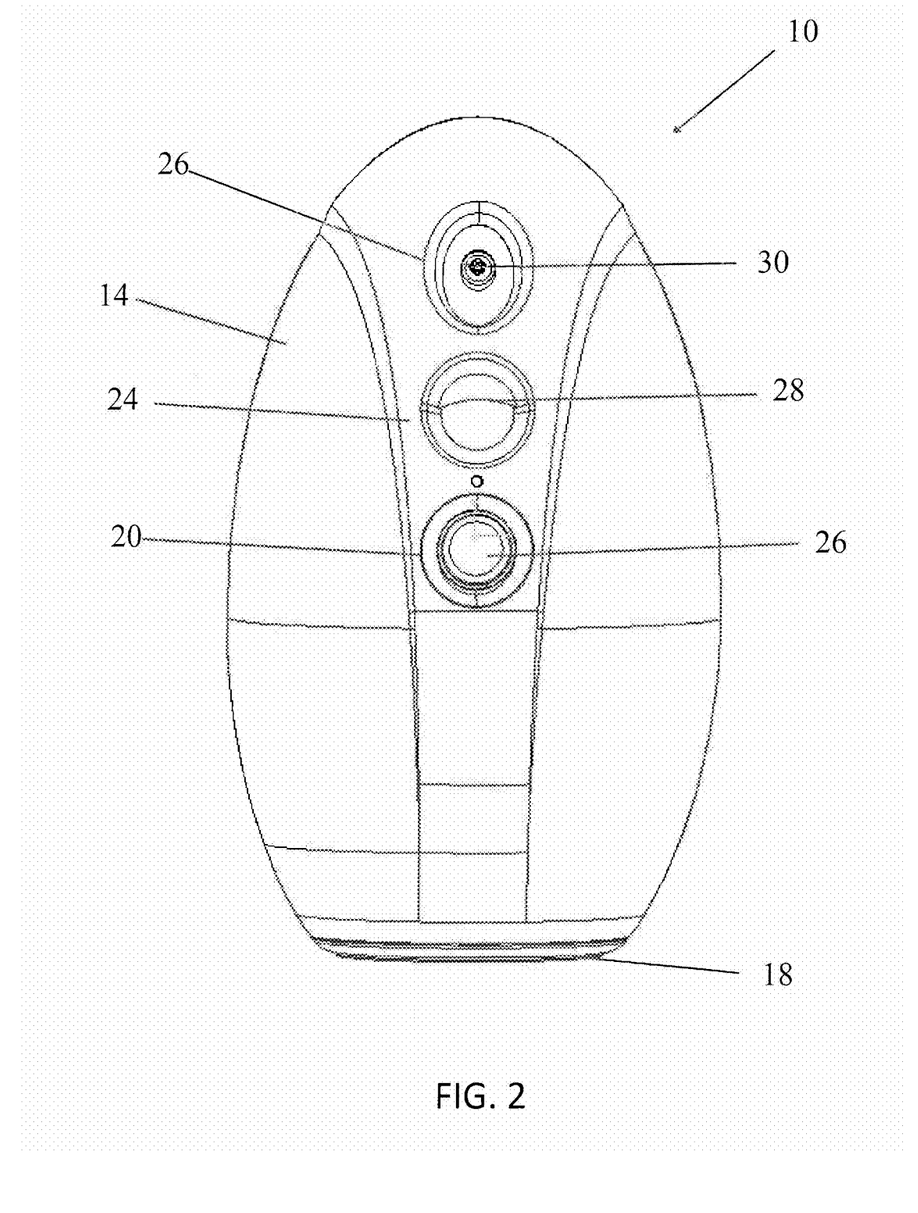
FIG. 2 depicts a front view of the animal deterrent device of FIG. 1.

Referring now to the drawing figures in which like reference designators refer to like elements, there is shown in FIGS. 1 and 2 an animal deterrent device 10 of the present disclosure. The animal deterrent device 10 includes a housing 12 having a front portion 14 and a back portion 16. The front and back portions 14 and 16 combine to form the housing 12, defining a bottom surface 18 for supporting the housing in an upright position, where the back portion 16 can be removeably attached to the front portion 14. The front portion 14 of the housing 12 can include a plurality of orifices 20, 22, 24 into which an ON/Off switch 26, a sensor 28, and a nozzle 30 are positioned. A light element 25 can be included to indicate the status of the animal deterrent device 10.

Figure 3:
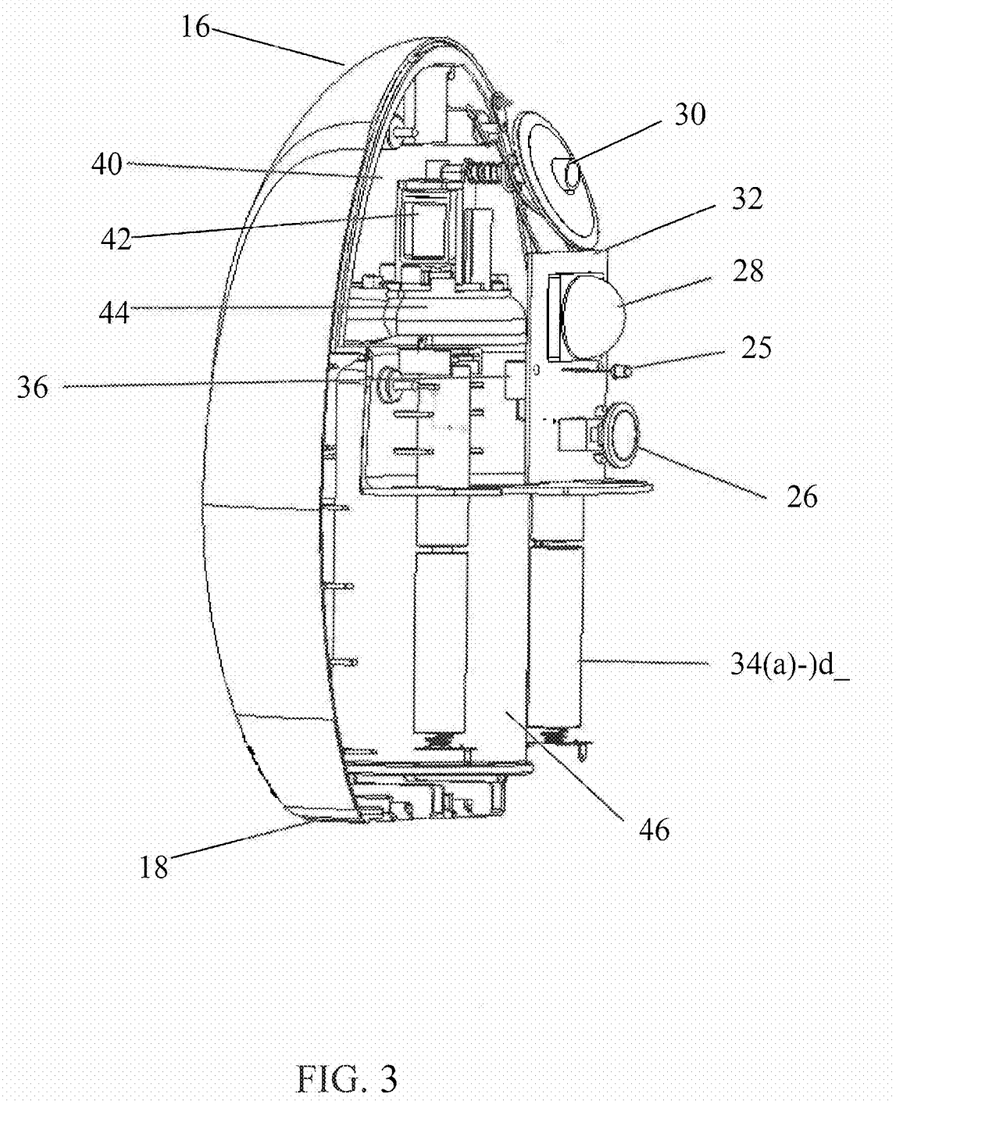
FIG. 3 depicts a side sectional view of the animal deterrent device of FIG. 1.

Referring to FIG. 3, a controller 32 is provided within the front portion 14 of the housing 12, and connected to a power supply 34. The power supply 34 can take the form of one of one or more batteries 34(a)-(d). Alternatively, the power supply 34 can include a power cord connected to a household power source (not shown).

The ON/OFF switch 26 can be connected between the controller 32 and the power supply 34, where the ON/OFF switch 26 can be movable between a first position and a second position. In the first position the ON/OFF switch 26 is closed providing power to the controller 32, and in the second position the ON/OFF switch 26 is open removing power from the controller 32. The ON/OFF switch 26 can be depression switch, slide switch, toggle switch, or other switches which perform the same function of turning ON and OFF the power to the controller 32.

The sensor 28 is also connected to the controller 32. The sensor 28 is utilized to detect the presence of an animal in a designated area. When an animal is detected in the designated area the sensor provides a signal to the controller 32 to emit a deterring stimulus. For example, and describe in more detail below, upon detection of a animal in the designated area the sensor 26 send a signal to the controller 32 to emit the deterring stimulus of jet of compressed gas through the nozzle 30. The sensor 28 can be a motion sensor, infrared sensor, and other known sensors for detecting the presence of the animal.

An orientation (tilt) sensor 36 is connected to the controller 32. The orientation sensor 36 operates to verify that the housing 12 is position in an operational, vertical or substantially vertical, position. If the housing 12 has been knocked over, and is in a horizontal or substantially horizontal position, the orientation sensor 36 sends a signal to the controller 32 to prevent operation and an emission of the deterring stimulus.

Additionally, upon receipt of such a signal from the orientation sensor 36, the controller 32 can active an alarm to indicate to a user that the housing 12 has be knocked over. The alarm can take the form of a visible alarm, such as a flashing light or led 25, or an audible alarm.

Figure 4:
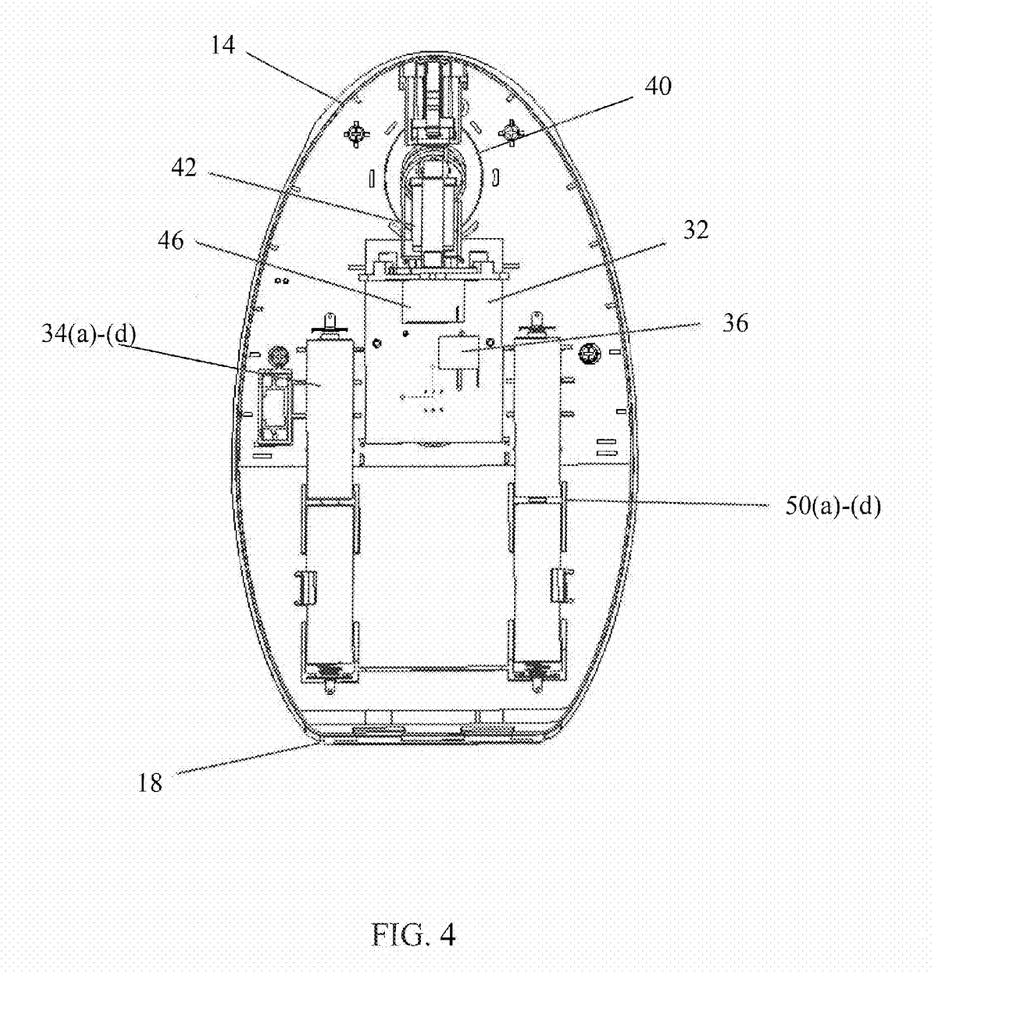
FIG. 4 depicts a rear sectional view of the animal deterrent device of FIG. 1.

Referring also to FIG. 4, a fluid dispensing system 40 can connected to the controller 32. The fluid dispensing system 40 can include the nozzle 30 in fluid connection to an actuateable valve 42, solenoid valve. A fluid source connector 44 is connected to the actuateable valve 42, opposite the nozzle 20. A fluid source 46, such as a canister of compressed gas or liquid, is removeably connectable to the fluid source connector 44. For example, the fluid source connector 44 can include a threaded interface 48, such that the fluid source 46 can be threadably connected to the fluid source connector 44. Additionally, a plurality of battery supports 50 (a)-(d) can be provide in the housing 12, where each of plurality of batteries 34(a)-(d) is positionable therein.

Figure 5:
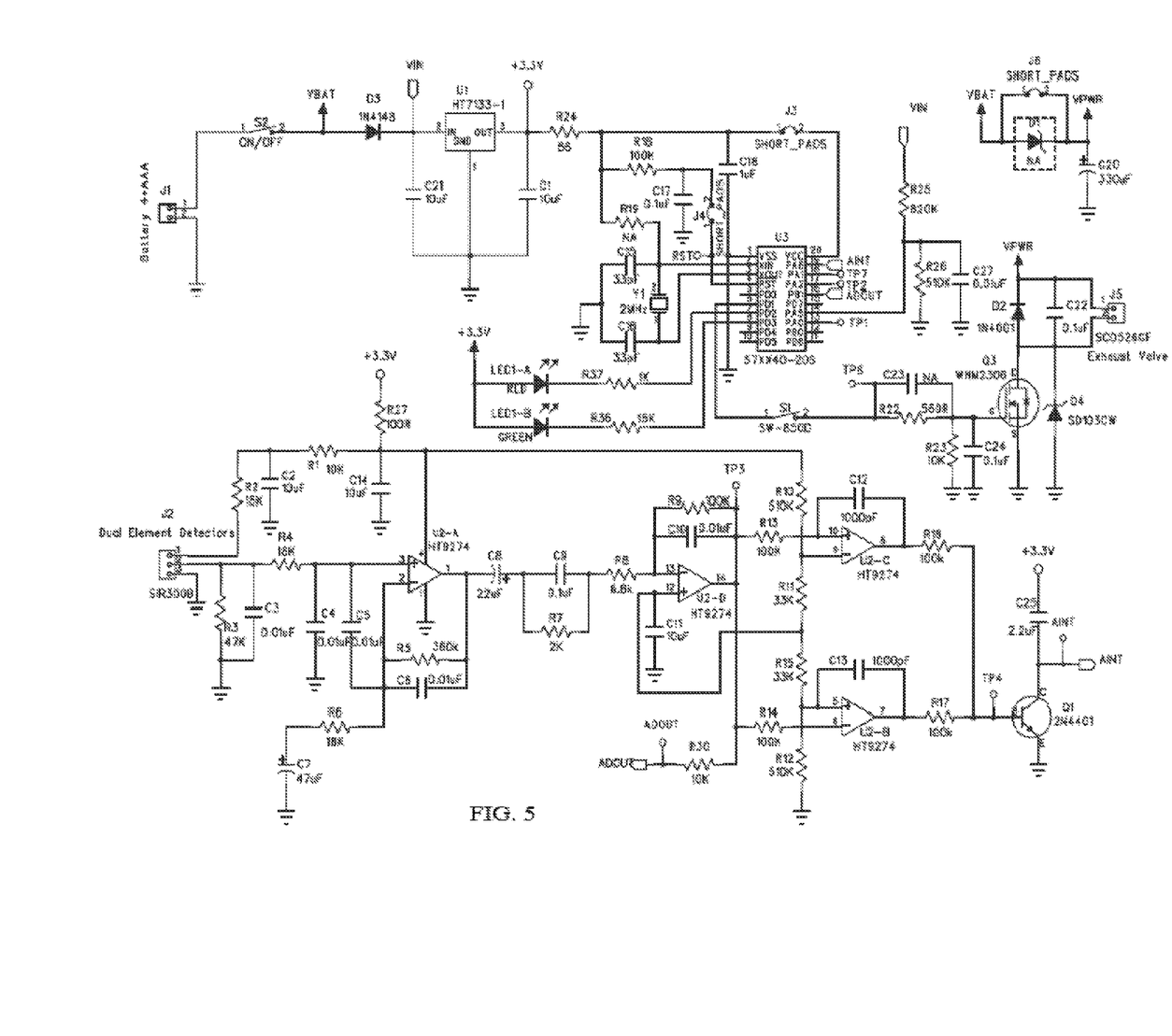
FIG. 5 depicts a diagram of a controller for use n the animal deterrent device of the present disclosure.

Referring to FIG. 5, an exemplary diagram of a controller 32 for use in the animal deterrent device 10 is provided.

Figure 6:
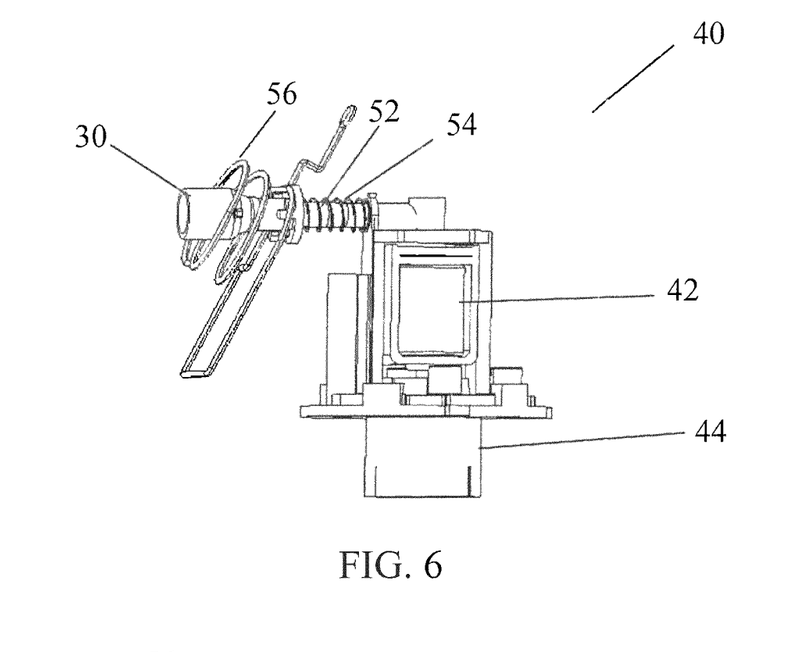
FIG. 6 depicts a first isometric view of a fluid dispensing system 40 for use in an animal deterring device.
Figure 7:
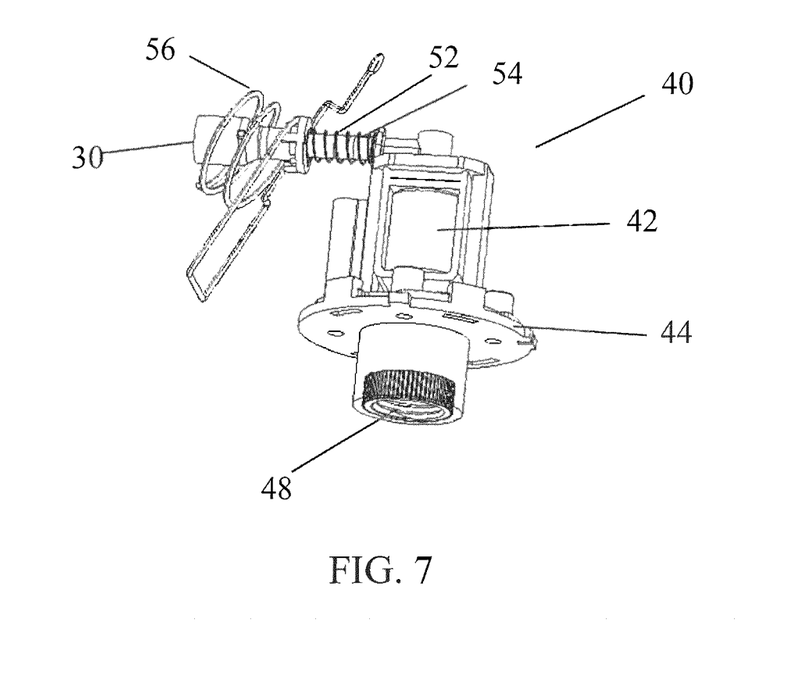
FIG. 7 depicts a second isometric view of a fluid dispensing system 40 for use in an animal deterring device.

Referring also to FIGS. 6-7, the nozzle 30 can be a adjustable nozzle were the direction of the nozzle output can be adjusted in both the vertical and horizontal directions, and combinations thereof. The nozzle 30 can be connected to the actuateable valve 42 with a flexible tube 52, where a tensioning spring 54 can be positioned about the flexible tube 52 between the nozzle 30 and the actuateable valve 42. The flexible tube 52 and spring 54 combination allows for relative movement of the nozzle 30 with respect to the actuateable valve 42, while maintaining a open fluid path therebetween.

A torsional member 56 is position about, and engagement with, the nozzle 30. A second portion of the torsional member 56 is connected to the housing 12. The torsional member allows for relative movement of the nozzle 30 with respect to the front portion 14 of the housing, where the torsional member 56 acts to retain the relative position of the nozzle 30. In the manner, a user can position the nozzle 30 with respect to the housing 12, such that the output of the nozzle 30 can be directed in a desired direction.

In an exemplary method of use, a user positions the animal deterrent device 10 is a desired location, for example near a couch. The front portion 14 of the housing is directed towards the couch, such that the sensor 28 can detect the presence of an animal on the couch. The nozzle 30 is positioned by the user in the desired direction. To activate the animal deterrent device 10 the user depresses the ON/OFF switch 26.

Once activated, if the sensor 28 detects an animal in the designated areas, a signal is sent to the controller 32. In turn, the controller sends a signal to the actuated valve 42, opening the valve 42 to send a jet of compressed gas out through the nozzle 30. The release of the compressed gas generates a sound of sufficient loudness to startle the animal, removing it from the designated area. Once the system has been activated, the system will be suppressed for a period of time, for example 4 seconds, before it can be active again.

Figure 8:
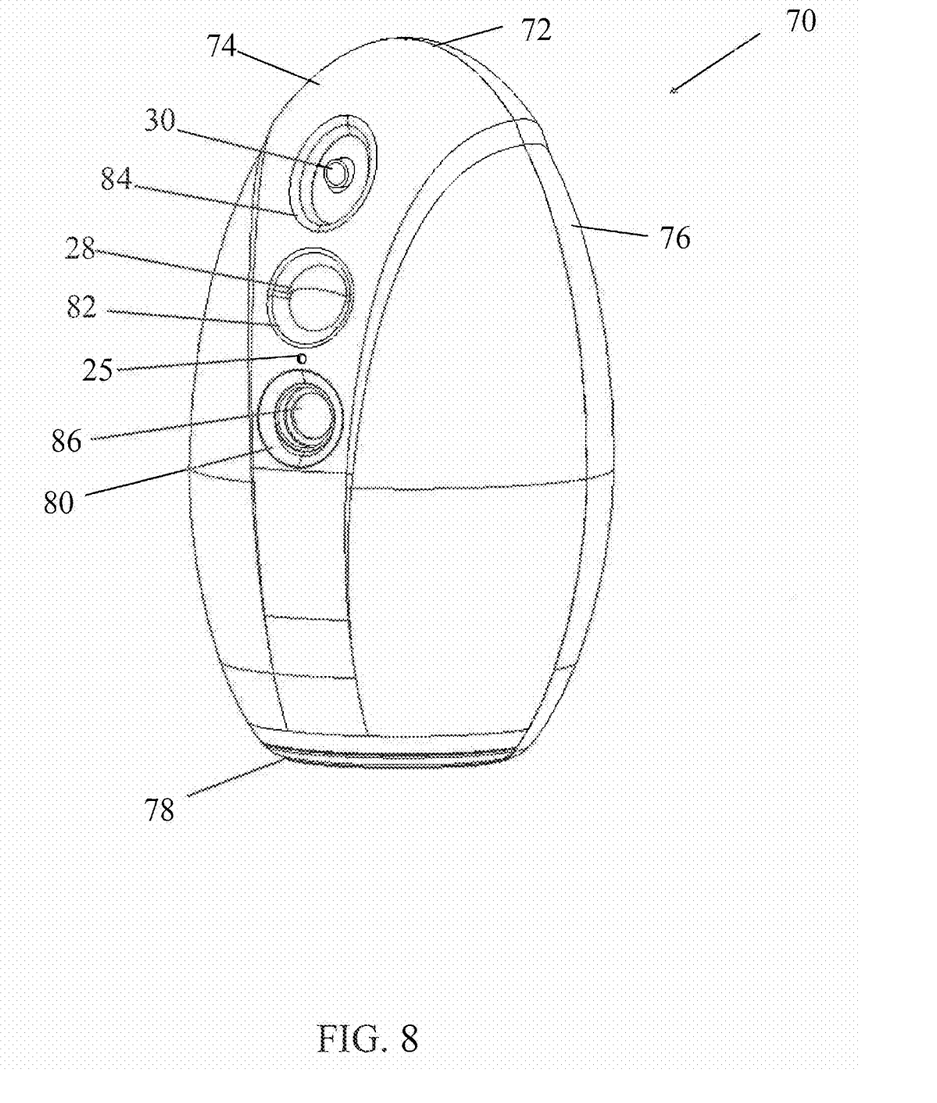
FIG. 8 depicts a front isometric view of an alternative animal deterrent device of the present disclosure.
Figure 9:
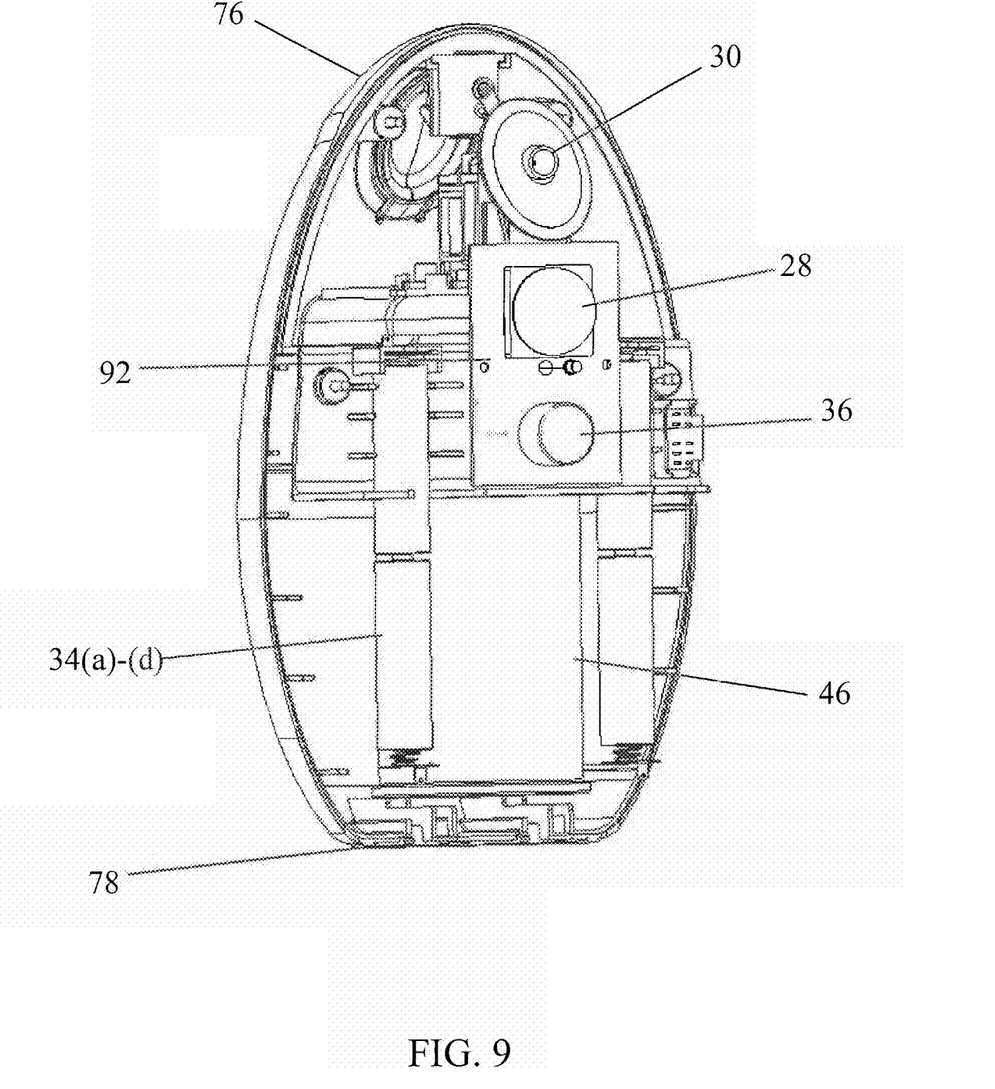
FIG. 9 depicts a front sectional view of the animal deterrent device of 7.

In an alternative embodiment, the animal deterrent device further includes a sound emitting device, such as a speaker or ultra sonic emitter. Referring to FIGS. 8-9, the alternative embodiment of the animal deterrent device 70 is shown. The animal deterrent device 70 includes a housing 72 having a front portion 74 and a back portion 76. The front and back portions 74 and 76 join to form the housing 72, defining a bottom surface 78 for supporting the housing in an upright position, where the back portion 76 can be removeably attached to the front portion 74. The front portion 74 of the housing 72 includes a plurality of orifices 80, 82, 84 into which a sound emitter 86, a sensor 28, and a nozzle 30 are positioned.

A controller 92 is provided within the housing 72, and connected to a power supply 94. The sound emitter 86 is connected to the controller 92. When activated, the sound emitter 86 emits a sound to startle the animal. The emitted sound can be an audible sound or an ultra sonic signal.

Similar to the embodiment described above, the alternative animal deterrent device 70 includes the power supply 34, motion sensor 28, nozzle 30, fluid deposing system 40, and orientation (tilt) sensor 36, all of which a operated in accordance as previously described.

Figure 10:
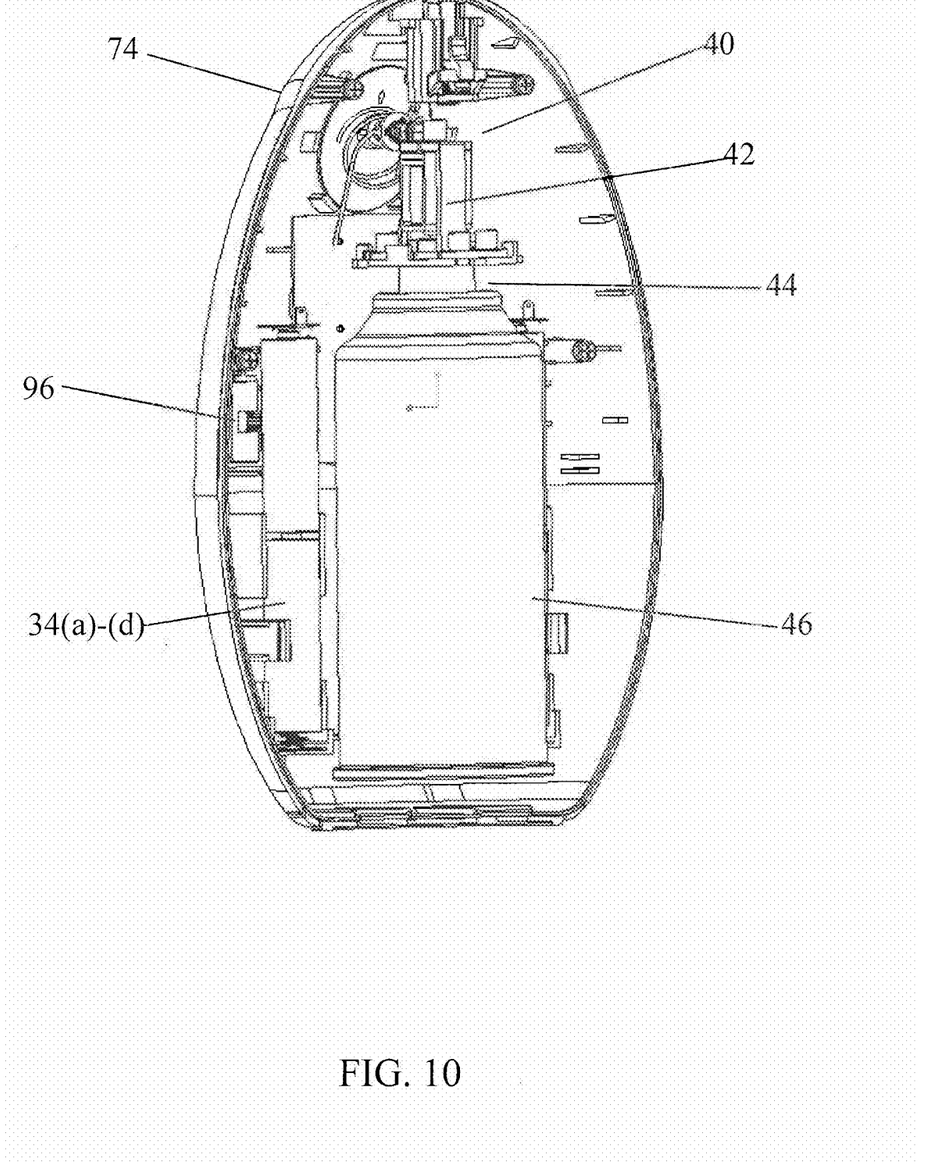
FIG. 10 depicts a rear sectional view of the animal deterrent device of FIG. 7.

Referring to FIG. 10, an ON/OFF switch 96 can be connected between the controller 92 and the power supply 94, where the ON/OFF switch 66 can be movable between a first position and a second position. In the first position the ON/OFF switch 96 is closed providing power to the controller 92, and in the second position the ON/OFF switch 96 is open removing power from the controller 92.

Alternatively, the ON/OFF switch 96 can be a multi-position switch, allowing a user to selection the mode of operation of the deterring stimulus of the animal deterrent device 70. For example, the multi-position switch 96 can be a four position switch, which in a first position the animal deterrent device 70 is OFF, in a second position only the fluid dispensing system 40 is activated, in a third position only the sound emitter 86 is activated, and is a fourth position both the fluid dispensing system 40 and sound emitter are activated.

In an exemplary method of use, a user positions the animal deterrent device 70 is a desired location, example near a couch. The front portion 74 of the housing 72 is directed towards the couch, such that the sensor 28 can detect the presence of an animal on the couch. The nozzle 30 is positioned by the user in the desired direction.

To activate the animal deterrent device 70 the user selects the mode of operation ON/OFF switch 96, moving the switch 96 from the first position to either the second, third or fourth positions. Once activated, if the sensor 28 detects an animal in the designated areas, a signal is sent to the controller 92 to activate a deterring stimulus.

If the switch 96 is positioned in the second position, the controller 92 sends a signal to the actuated valve 42, opening the valve 42 to send a jet of compressed gas out through the nozzle 30. The release of the compressed gas generates a sound of sufficient loudness to startle the animal, removing it from the designated area. Once the system has been activated, the system will be suppressed for a period of time, for example four (4) seconds, before it can be active again.

If the switch 96 is positioned in the third position, the controller 92 sends a signal to the sound emitter 86. The sound emitter 86 can generate a sound of sufficient loudness to startle the animal, removing it from the designated area. Alternatively, the sound emitter 86 is an ultra-sonic emitter, and generates an ultra-signal to startle the animal, removing it from the designated area. Once the system has been activated, the system will be suppressed for a period of time, for example four (4) seconds, before it can be active again.

If the switch 96 is positioned in the forth position, both the fluid dispensing system 40 and sound emitter 86 are activated. In such case, the controller 92 simultaneously sends a signal to the actuated valve 42 and the sound emitter 86. The actuated valve 42 is opened to send a jet of compressed gas out through the nozzle 30. The release of the compressed gas generates a sound of sufficient loudness to startle the animal The sound emitter 86 can generate a sound of sufficient loudness to startle the animal. The activation of the both the fluid dispensing system 40 and sound emitter 86 provide a deterring stimulus for removing the animal form the designated area. Once the system has been activated, the system will be suppressed for a period of time, for example four (4) seconds, before it can be active again.

All references cited herein are expressly incorporated by reference in their entirety.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. An animal deterrent device comprising:
   a housing;
   a controller positioned in the housing;
   an animal presence sensor;
   a deterrent emitter including a fluid dispensing system having a nozzle operably connected to actuateable valve and a sound emitter;
   a orientation sensor; and
   a multi-positional switch, moveable between: a first, off, position; a second position activating the fluid dispensing system; a third position activating the sound emitter; and a forth position activating both the fluid dispensing system and the sound emitter,
   wherein the animal presence sensor, the deterrent emitter, and the orientation sensor are operably connected to the controller.

2. The animal deterrent device as set forth in claim 1, wherein the fluid dispensing system further comprises a canister removeably connectable to the actuateable valve.

3. The animal deterring device as set forth in claim 2, wherein the canister include a compressed gas or a compressed liquid.

4. The animal deterrent device as set forth in claim 1, wherein an output direct of the nozzle is adjustable with regards to the housing in a vertical and horizontal directions.

5. The animal deterrent device as set forth in claim 1, wherein the sound emitter is a speaker or a ultra-sonic signal emitter.

6. The animal deterrent device as set forth in claim 1, wherein the orientation sensor deactivates the deterrent emitter when the housing is in a horizontal or substantially horizontal position.

7. The animal deterrent device as set forth in claim 1, further comprising a power supply connected to the controller.

8. An animal deterrent device comprising;
   a housing;
   a controller positioned in the housing;
   an animal presence sensor;
   a deterrent emitter including a fluid dispensing system having a nozzle operably connected to actuateable valve and as sound emitter;
   a orientation sensor; and
   a multi-positional switch, moveable between: a first, off, position; a second position activating the fluid dispensing system; a third position activating the sound emitter; and a forth position activating both the fluid dispensing system and the sound emitter,
   wherein the animal presence sensor, the deterrent emitter, and the orientation sensor are operably connected to the controller, and wherein the orientation sensor deactivates the deterrent emitter when the housing is in a horizontal or substantially horizontal position.

9. The animal deterrent device as set forth in claim 8, wherein the fluid dispensing system further comprises a canister removeably connectable to the actuateable valve.

10. The animal deterrent device as set forth in claim 8, wherein an output direction of the nozzle is adjustable with regards to the housing in a vertical and horizontal directions.

11. The animal deterrent device as set forth in claim 8, wherein the sound emitter is a speaker or a ultra-sonic signal emitter.

12. An animal deterrent device comprising;
    a housing;
    a controller positioned in the housing;
    an animal presence sensor;
    a deterrent emitter including a fluid dispensing system having a nozzle operably connected to actuateable valve and sound emitter; and
    a multi-positional switch, moveable between: a first, off, position; a second position activating the fluid dispensing system; a third position activating the sound emitter; and a forth position activating both the fluid dispensing system and the sound emitter, wherein the animal presence sensor and the deterrent emitter are operably connected to the controller.

13. The animal deterrent device as set forth in claim 12, further comprising an orientation sensor operably connected to the controller.

14. The animal deterrent device as set forth in claim 13, wherein the orientation sensor deactivates the deterrent emitter when the housing is in a horizontal or substantially horizontal position.

* * * * *